(12) United States Patent
Cunningham et al.

(10) Patent No.: US 9,175,629 B2
(45) Date of Patent: Nov. 3, 2015

(54) METHODS AND SYSTEMS FOR PROVIDING TRANSIENT TORQUE RESPONSE

(71) Applicant: Ford Global Technologies, LLC, Dearborn, MI (US)

(72) Inventors: Ralph Wayne Cunningham, Milan, MI (US); Matthew John Gerhart, Dearborn Heights, MI (US); Julia Helen Buckland, Commerce Township, MI (US); Suzanne Kay Wait, Royal Oak, MI (US); Michael Howard Shelby, Plymouth, MI (US); Jeffrey Allen Doering, Canton, MI (US); Mrdjan J. Jankovic, Birmingham, MI (US); John Eric Rollinger, Sterling Heights, MI (US); Gopichandra Surnilla, West Bloomfield, MI (US); Naginder Gogna, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 13/903,807

(22) Filed: May 28, 2013

(65) Prior Publication Data

US 2014/0352669 A1 Dec. 4, 2014

(51) Int. Cl.
*F02B 33/44* (2006.01)
*F02M 25/07* (2006.01)
*F02D 41/14* (2006.01)
*F02D 41/00* (2006.01)
*F02D 41/04* (2006.01)
*F02D 41/10* (2006.01)
*F02D 11/10* (2006.01)

(52) U.S. Cl.
CPC .......... *F02D 41/1486* (2013.01); *F02D 11/105* (2013.01); *F02D 41/006* (2013.01); *F02D 41/0007* (2013.01); *F02D 41/0065* (2013.01); *F02D 41/045* (2013.01); *F02D 41/10* (2013.01); *F02M 25/0709* (2013.01); *F02D 11/10* (2013.01); *F02D 2041/001* (2013.01); *F02D 2200/0406* (2013.01); *F02D 2200/0411* (2013.01); *F02D 2250/18* (2013.01)

(58) Field of Classification Search
CPC .... F02M 25/07; F02M 25/0709; F02B 37/00; F02D 2200/0406; F02D 2200/0411; F02D 2250/18
USPC .............. 60/605.1, 605.2; 701/101, 102, 108; 123/568.14, 90.16
See application file for complete search history.

(56) References Cited

U.S. PATENT DOCUMENTS

| | | | |
|---|---|---|---|
| 6,367,462 B1 * | 4/2002 | McKay et al. | 123/568.21 |
| 6,692,406 B2 | 2/2004 | Beaty | |
| 7,213,566 B1 * | 5/2007 | Jankovic | 123/302 |
| 8,161,746 B2 | 4/2012 | Ulrey et al. | |
| 8,196,404 B2 * | 6/2012 | Onishi et al. | 60/605.2 |

(Continued)

*Primary Examiner* — Thai Ba Trieu
*Assistant Examiner* — Vikansha Dwivedi
(74) *Attorney, Agent, or Firm* — Julia Voutyras; Alleman Hall McCoy Russell & Tuttle LLP (57) ABSTRACT

A method and system for providing a suitable engine torque response during a transient condition is presented. In one example, when a desired inlet manifold pressure is greater than a throttle inlet pressure of a first throttle, a second throttle positioned upstream from the first throttle is opened to increase the throttle inlet pressure. The method may provide an appropriate torque response while minimizing impact on fuel economy.

20 Claims, 3 Drawing Sheets

(56) References Cited

U.S. PATENT DOCUMENTS

2009/0223221 A1* 9/2009 Onishi et al. .................. 60/603
2010/0326408 A1* 12/2010 Clarke et al. ............. 123/568.21
2011/0067395 A1* 3/2011 Suhocki ......................... 60/602
2012/0023934 A1 2/2012 Pursifull et al.

* cited by examiner

METHODS AND SYSTEMS FOR PROVIDING TRANSIENT TORQUE RESPONSE

BACKGROUND AND SUMMARY

An engine system may be configured with a boosting device, such as a turbocharger, for providing a boosted air charge to increase torque output. In particular, a turbine is rotated using energy from an exhaust flow. The turbine drives a compressor which delivers a boosted air charge to the engine intake. An engine system may also be configured with an exhaust gas recirculation (EGR) system wherein at least a portion of the exhaust gas is recirculated to the engine intake. For example, the EGR system may be a low-pressure EGR system (LP-EGR) that recirculates exhaust gas from downstream of the turbine to upstream of the compressor. EGR benefits include an increase in engine dilution, decrease in exhaust emissions, and an increase in fuel economy.

An engine system may arbitrate multiple systems and actuators in order to increase fuel economy while providing acceptable vehicle performance. For example, reducing throttling losses is one example of an opportunity to increase fuel economy. However, throttling is also an approach for holding torque in reserve that is quickly and easily accessible to provide a quick pedal response (i.e., reduce response lag to produce torque output) to provide acceptable vehicle performance. Moreover, the LP-EGR system may complicate matters relating to response lag due to a large diluted volume of EGR in the LP-EGR system that may provide a torque shortfall.

To address these issues, engine control systems may employ various approaches for improving torque response to provide acceptable vehicle performance. In one example, a driver is required to increase a pedal angle (e.g., tip-in) to initiate a transient conditions mode that triggers pre-planned actions to increase torque output. Such pre-planned actions may include adjusting variable valve timing (VVT) maps to a maximum effective volume, a transmission event (e.g., a downshift), and increasing boost.

However, the inventors herein have identified issues with such approaches. For example, the driver may perceive a noticeable "dead/spongy pedal" zone with no driver observable torque increase before the pre-planned actions are triggered. Further, once the pre-planned actions are triggered, the resulting torque increase typically is greater than desired. For example, the excessive torque increase may require additional pedal correction by the driver (e.g., tip-out). Moreover, such pre-planned actions may forfeit fuel efficiency in favor of quickly increasing torque output.

In one example, the above issues may be at least partly addressed by a method for providing an appropriate torque response during transient conditions. In one embodiment, the method comprises during a transient condition, when a desired inlet manifold pressure is greater than a throttle inlet pressure of a first throttle, if a pressure drop across a second throttle that is positioned upstream from the first throttle in an intake passage is greater than a pressure threshold, opening the second throttle to increase the throttle inlet pressure.

For example, the first throttle may be an engine throttle and the second throttle may be an air intake system (AIS) throttle that draws EGR from a LP-EGR system into an intake passage. During such transient conditions, exhaust pressure may be high enough to provide a suitable mass flow of EGR that the AIS throttle may be redundant, and the AIS throttle may be opened to provide the increase in throttle inlet pressure without losing EGR control or forfeiting fuel economy. By opening the AIS throttle, air flow may be increased to provide just enough torque without substantially overshooting the torque demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to systems and methods for providing an appropriate torque response during transient conditions. More particularly, the present description relates to identifying a torque shortfall during transient conditions, and performing transient actions to provide an appropriate torque response to compensate for the shortfall without substantially overshooting the desired torque while maintaining fuel efficient operation.

In one example, a torque shortfall may be identified as a torque request that is greater than a nominal road load that results in a desired manifold absolute pressure (MAP) being greater than a throttle inlet pressure (TIP). In order to compensate for the torque shortfall so that the TIP meets the desired MAP to provide a commanded torque output, several potential transient actions may be performed. For example, if a secondary air intake system (AIS) throttle pressure drop is greater than a threshold value (e.g., substantially zero), then the AIS throttle may be opened to increase TIP to meet the desired MAP. In another example, if a cylinder volumetric efficiency is less than optimal for the given operating conditions, then variable valve timing (VVT) may be adjusted to decrease an internal trapping of EGR in the cylinders. By decreasing the internal trapping of EGR in the cylinders, air flow/power may be increased at a reduced desired MAP to achieve a torque output that meets a commanded torque output. In yet another example, if EGR flow is greater than a threshold (e.g., substantially zero), then EGR flow may be reduced to less than the threshold (e.g., to substantially zero). By reducing EGR flow, engine dilution may be reduced, and thus the desired MAP required to achieve the commanded torque output may be reduced.

Once the commanded torque output is achieved, the temporary actions may be terminated and actuators may be adjusted back to "steady state" settings. The above described actions may be performed alone, or in combination, to respond quickly, with just enough torque to meet the commanded torque increase without substantially overshooting the commanded torque output while minimzing impact on fuel economy fuel economy. In other words, these actions may be performed to meet a commanded torque output without throttling a primary throttle that may cause throttling losses that reduce fuel economy.

Figure 1:
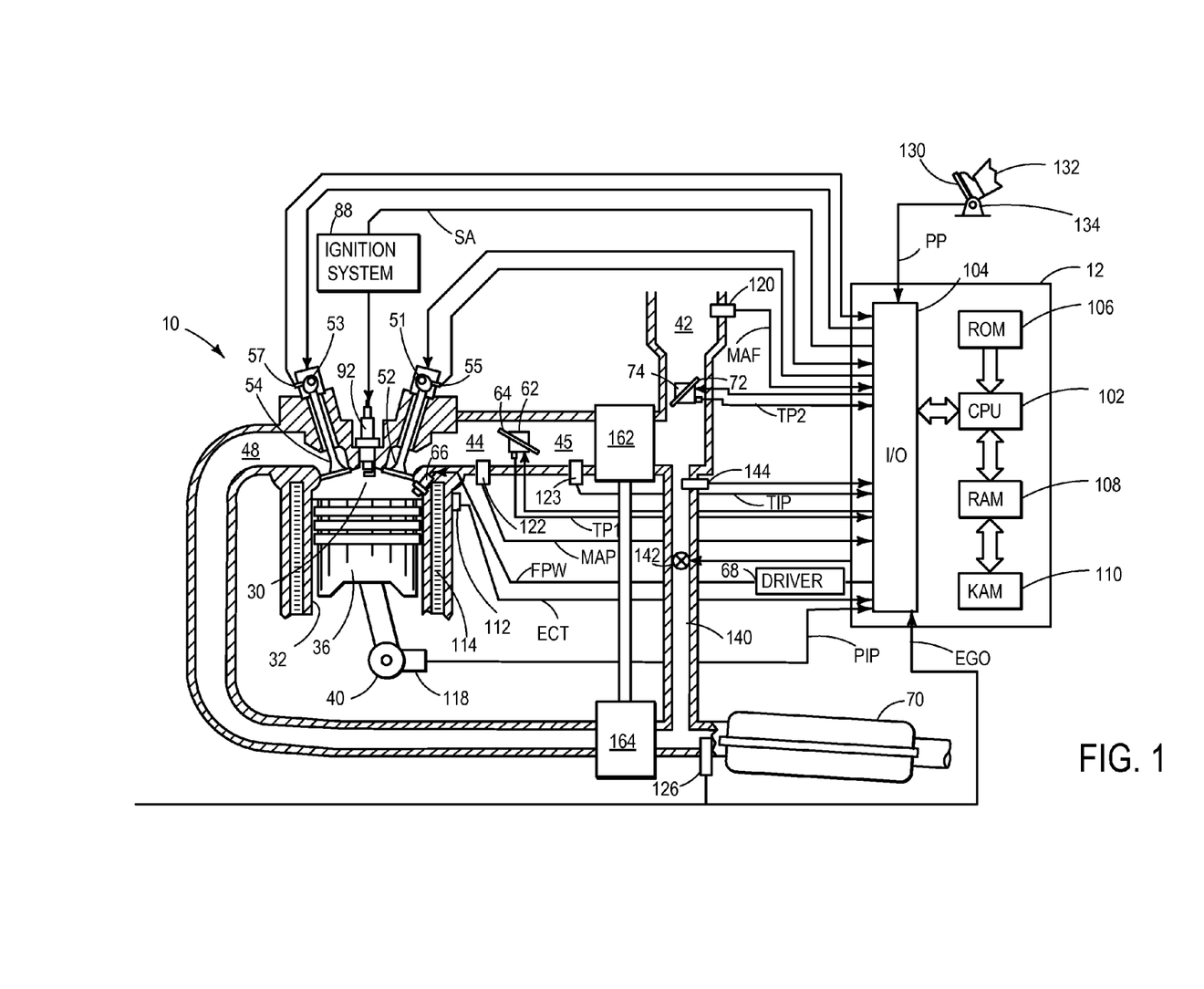
FIG. 1 shows a schematic depiction of a boosted engine system including a low pressure exhaust gas recirculation system (LP-EGR) according to an embodiment of the present disclosure.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

A compression device such as a turbocharger or supercharger including at least a compressor 162 may be arranged along intake passage 42. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

A low-pressure exhaust gas recirculation (LP-EGR) system may route a desired portion of exhaust gas from exhaust passage 48 downstream of turbine 164 to intake passage 42 upstream of compressor 162 via EGR passage 140. An amount of EGR provided to intake passage 42 may be varied by controller 12 via EGR valve 142. The EGR valve 142 may be opened to admit a controlled amount of exhaust gas to the compressor inlet for desirable combustion and emissions-control performance. In this way, engine system 10 is adapted to provide external, low-pressure (LP) EGR. The rotation of the compressor, in addition to the relatively long LP EGR flow path in engine system 10, facilitates homogenization of the exhaust gas into the intake air charge. Further, the disposition of EGR take-off and mixing points provides effective cooling of the exhaust gas for increased available EGR mass and increased performance.

Further, an EGR sensor 144 may be arranged within the EGR passage 140 and may provide an indication of one or more pressure, temperature, and concentration of the exhaust gas. Under some conditions, the LP-EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism (e.g., cam actuation systems 53 and/or 51).

Intake passage 42 may include an engine throttle 62 (a.k.a., a primary throttle) having a throttle plate 64. Engine throttle 62 may be positioned downstream of compressor 162 to vary air intake into combustion chamber 30 among other engine cylinders. Intake manifold 44 may be downstream of engine throttle 62 and a boost chamber 45 may be upstream of engine throttle 62 and downstream of compressor 162. In this particular example, the position of throttle plate 64 may be varied by controller 12 via a signal provided to an electric motor or actuator included with throttle 62, a configuration that is commonly referred to as electronic throttle control (ETC). The position of throttle plate 64 may be provided to controller 12 by throttle position signal TP1.

Intake passage 42 may include an air intake system (AIS) throttle 72 having a throttle plate 74. AIS throttle 72 may be positioned upstream of compressor 162. In this particular example, the position of throttle plate 74 may be varied by controller 12 via a signal provided to an electric motor or actuator included with AIS throttle 72. The position of throttle plate 74 may be provided to controller 12 by throttle position signal TP2. Further, EGR is provided via EGR passage 140 to intake passage 42 downstream of AIS throttle 72. EGR may be drawn from exhaust passage 48 to intake passage 42 when AIS throttle 72 is partially closed. AIS throttle 72 controls intake air and EGR flow to compressor 162.

Intake passage 42 may include a mass air flow sensor 120 for providing a MAF signal to controller 12. A manifold absolute pressure sensor 122 may be positioned downstream of engine throttle 62 to sense the pressure of air charge in engine manifold 44 and provide a MAP signal to controller 12. A throttle inlet pressure sensor 123 may be positioned upstream of engine throttle 62 in boost chamber 45 to sense the pressure of air charge exiting compressor 162 and provide a TIP signal to controller 12. In some examples, an additional pressure sensor may be positioned between AIS throttle 72 and an inlet of compressor 162 to provide pressure information to controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126 and turbine 164. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may be configured to command the opening, closure, and/or adjustment of various electronically actuated valves in the engine system—throttle valves, compressor by-pass valves, waste gates, EGR valves and shut-off valves, various reservoir intake and exhaust valves, for example—as needed to enact any of the control functions described herein. Further, to assess operating conditions in connection with the control functions of the engine system, controller 12 may be operatively coupled to a plurality of sensors arranged throughout the engine system—flow sensors, temperature sensors, pedal-position sensors, pressure sensors, etc.

For example, controller 12 may receive various signals from sensors coupled to engine 10, in addition to those signals previously discussed, including measurement of engine coolant temperature (ECT) from temperature sensor 112 coupled to cooling sleeve 114; and a profile ignition pickup signal (PIP) from Hall effect sensor 118 (or other type) coupled to crankshaft 40. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Computer-readable storage medium read-only memory 106 can be programmed with computer-readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

In engine system 10, compressor 162 is the primary source of compressed intake air, but under some conditions, the amount of intake air available from the compressor may be inadequate to meet a desired MAP. Such conditions may include transient periods of rapidly increasing engine load, such as immediately after start-up, upon tip-in, or upon exiting deceleration fuel shut-off (DFSO). During at least some of these conditions of rapidly increasing engine load, the amount of compressed intake air available from the compressor may be limited due to the turbine not being spun up to a sufficiently high rotational speed (for example, due to low exhaust temperature or pressure). As such, the time required for the turbine to spin up and drive the compressor to provide the required amount of compressed intake air is referred to as turbo lag or response lag. During such transient conditions, the controller 12 may be configured to perform various actions to quickly increase torque output (or reduce engine load) in order to reduce the response lag while minimizing impact on fuel economy.

In one example, the controller 12 may be configured to identify a torque shortfall for a torque request that is greater than a nominal road load. For example, the controller 12 may be configured to determine that a desired manifold absolute pressure is greater than a throttle inlet pressure. For example, such a determination may be based on MAP and TIP signal provided from respective pressure sensors. In order to compensate for the torque shortfall, the controller 12 may be configured to determine whether there is a pressure drop across AIS throttle 72 greater than a threshold value (e.g., substantially zero). If there is a pressure drop across AIS throttle 72 that is greater than a threshold value, then controller 12 may be configured to open AIS throttle 72. In one particular example, controller 12 adjusts AIS throttle 72 to a fully open position to increase TIP. By opening AIS throttle 72, the TIP may be increased to meet the desired MAP. In this way, the torque output may be increased quickly to compensate for the torque shortfall without creating throttling losses that reduce fuel economy.

Further, controller 12 may be configured to determine whether a cylinder volumetric efficiency is less than optimal for the given operating conditions. Volumetric efficiency is a ratio (or percentage) of what quantity of fuel and air actually enters the cylinder during induction relative to the actual capacity of the cylinder under static conditions. If the volumetric efficiency is less than optimal, then controller 12 may be configured to adjust variable valve timing to decrease an internal trapping of EGR in the cylinders to increase volumetric efficiency. In one example, controller 12 adjusts cam actuation system 51 and 53 to adjust variable valve timing. By decreasing the internal trapping of EGR in the cylinders, air flow/power may be increased at a reduced desired MAP to achieve a torque output that meets a commanded torque output.

Further still, controller 12 may be configured to determine whether EGR flow is greater than a threshold value (e.g., substantially zero). If EGR flow is greater than the threshold value, then controller 12 may be configured to reduce EGR flow to less than the threshold (e.g., to substantially zero). In one particular, example controller 12 closes EGR valve 142. Further, EGR flow may be reduced when AIS throttle 72 is open. By reducing EGR flow, engine dilution may be reduced, and thus the desired MAP required to achieve the commanded torque output may be reduced. The controller 12 may be configured to perform two or more of the above described actions to compensate for the torque shortfall. In some cases, two or more of these actions may be performed substantially in parallel.

Once the commanded torque output is achieved, the temporary actions may be terminated and the actuators (e.g., AIS throttle, VVT system, EGR valve) may be adjusted back to "steady state" settings. The above described actions may be performed alone, or in combination, to respond quickly, with just enough torque to meet the commanded torque increase without substantially overshooting the commanded torque output while minimizing impact on fuel economy.

Figure 2:
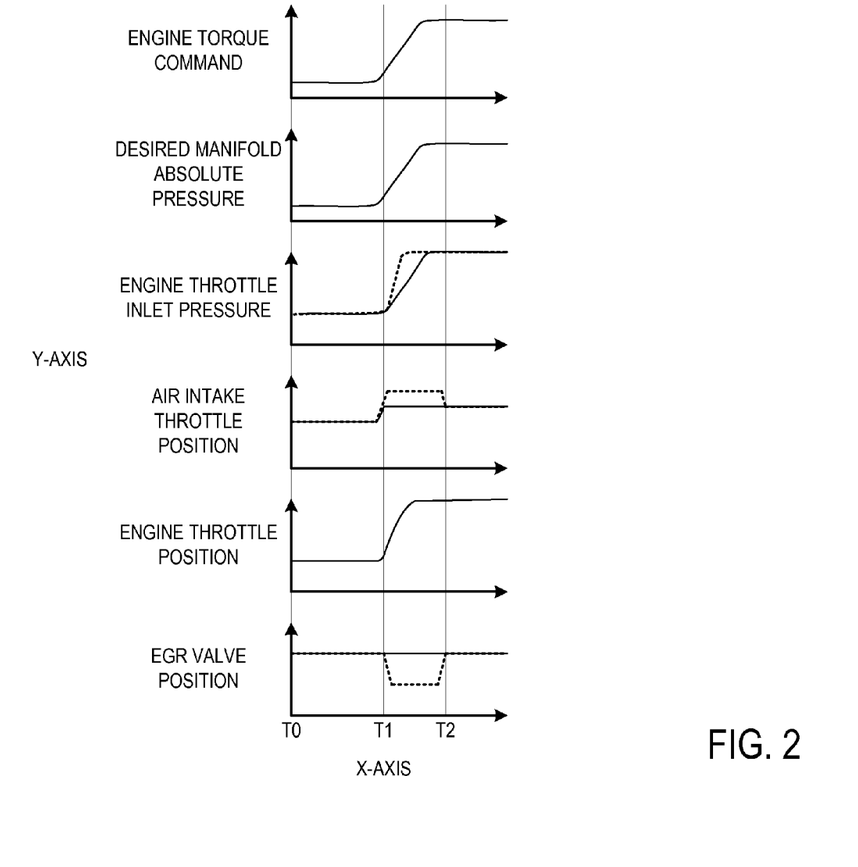
FIG. 2 shows simulated signals of interest during engine operation.

FIG. 2 shows simulated signals of interest during an engine operating sequence. A first set of signals in the sequence indicated by a solid line may be provided according to a typical control approach. A second set of signals in the sequence indicated by a dotted line may be provided according to a method of FIG. 3 via the system of FIG. 1. Vertical markers T0-T2 provide time references for events of interest during the operating sequence. The first signal from the top of FIG. 2 represents an engine torque command. The engine torque command may be generated via a driver command or a command of controller 12. The Y axis represents requested engine torque and requested engine torque increases in the direction of the Y axis arrow. The X axis represents time and time increase from the left to right side of FIG. 2.

The second signal from the top of FIG. 2 represents a desired manifold absolute pressure to provide air charge into the cylinders to provide the commanded engine torque. The Y axis represents a desired manifold absolute pressure and desired manifold absolute pressure increases in the direction of the Y axis arrow. The X axis represents time and time increase from the left to right side of FIG. 2.

The third signal from the top of FIG. 2 represents an engine throttle inlet pressure. For example, engine throttle inlet pressure may be sensed in boost chamber 45 via pressure sensor 123. The Y axis represents engine throttle inlet pressure and engine throttle inlet pressure increases in the direction of the Y axis arrow. The X axis represents time and time increase from the left to right side of FIG. 2.

The fourth signal from the top of FIG. 2 represents a position of an AIS throttle (e.g., throttle 72 of FIG. 1). The Y axis represents a degree of AIS throttle opening and the AIS throttle opening increases in the direction of the Y axis arrow. The X axis represents time and time increases from the left to right side of FIG. 2.

The fifth signal from the top of FIG. 2 represents a position of an engine throttle (e.g. throttle 62 of FIG. 1). The Y axis represents a degree of engine throttle opening and the engine throttle opening increases in the direction of the Y axis arrow. The X axis represents time and time increases from the left to right side of FIG. 2.

The sixth signal from the top of FIG. 2 represents an EGR valve position. The Y axis represents a degree of EGR valve opening and the opening increases in the direction of the Y axis arrow. The X axis represents time and time increases from the left to right side of FIG. 2. The engine torque command, the desired manifold absolute pressure, and the engine throttle position may be substantially the same for both sets of signals.

At time T0, the engine torque command is at a middle level. In one example, the engine torque level at time T0 represents an engine torque level at a vehicle cruising speed. The desired MAP and the TIP are also at middle levels. In other words, there is no torque shortfall due to a reduced TIP at time T0. The engine throttle is partially open to provide suitable air flow to meet the medium level commanded engine torque. The AIS throttle is partially closed so as to create a small pressure depression between the AIS throttle and the compressor. Since the EGR valve is also partially opened, EGR can flow to the engine at time T0.

At time T1, the engine torque command increases and the desired MAP increases to meet the engine torque command. The engine throttle position opens as the engine torque command changes so as to provide the commanded engine torque. However, the TIP is less than the desired MAP creating an engine torque shortfall.

In response to identifying the engine torque shortfall, between time T1 and time T2, the AIS throttle is opened to increase the TIP to meet the desired MAP and compensate for the engine torque shortfall. In one example, the AIS throttle is fully opened so that there is substantially no pressure differential across the AIS throttle. Further, the EGR valve is closed. Since the AIS throttle is open and the EGR valve is closed, substantially no EGR flows from the LP-EGR system or is drawn into to the cylinders. Accordingly, air charge dilution may be reduced and thus the MAP required to achieve increased airflow may also be reduced. Although not shown, additionally VVT may be adjusted to decrease internal EGR trapping in the cylinders, which also decreases the desired MAP required to provide the commanded engine torque. Note that the traditional control approach (solid line) does not open the AIS throttle and does not close the EGR valve during the transient condition, and results in a throttle inlet pressure shortfall.

At time T2, once boost pressure increases to compensate for the torque shortfall and the commanded engine torque is achieved, the transient actions may be terminated and the various actuators may be returned to "steady state" settings. For example, the AIS throttle may be closed, the EGR valve may be opened, and VVT may be adjusted to increase EGR trapping in the cylinders.

The configurations described above enable various methods for providing an engine torque response during transient conditions in a gasoline direct injection engine having a VVT system and a LP-EGR system. Accordingly, some such methods are now described, by way of example, with continued reference to the above configuration. It will be understood, however, that the methods here described, and others fully within the scope of this disclosure, may be enabled via other configurations as well. The methods presented herein include various measuring and/or sensing events enacted via one or more sensors disposed in the engine system. The methods also include various computation, comparison, and decision-making events, which may be enacted in an electronic control system operatively coupled to the sensors. The methods further include various hardware-actuating events, which the electronic control system may command selectively, in response to the decision-making events.

Figure 3:
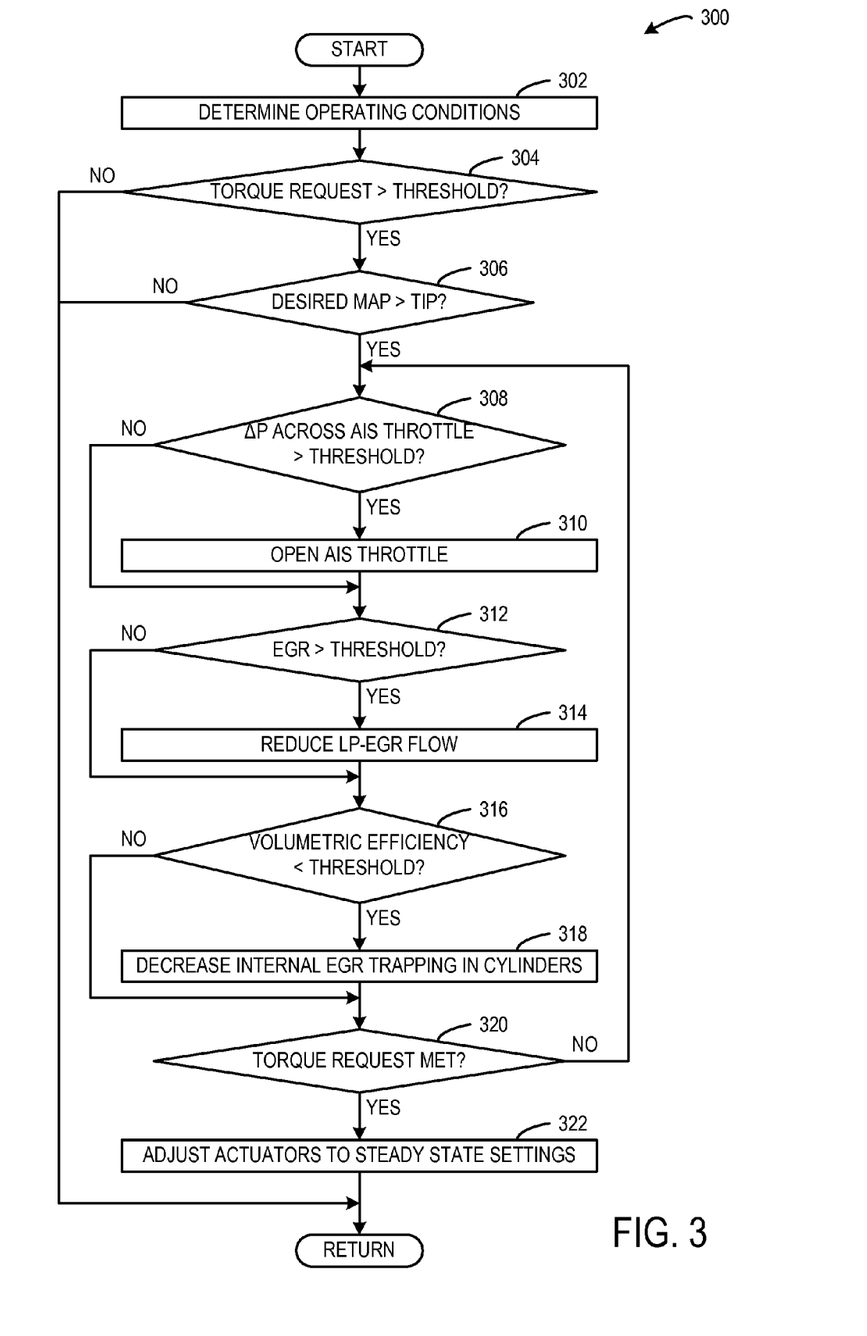
FIG. 3 shows a method for providing a transient torque response according to an embodiment of the present disclosure.

FIG. 3 shows a method 300 for providing an engine torque response during transient conditions. For example, the method 300 may be performed by controller 12 shown in FIG. 1.

At 302, the method 300 may include determining operating conditions. In one example, engine operating conditions may include engine speed, engine torque command, desired MAP, TIP, delta pressure across the AIS throttle, EGR dilution, volumetric efficiency of the cylinders, number of combustion events or cylinder cycles from an engine event (e.g., change in engine torque), compressor flow, compressor delta pressure (e.g., pressure ratio across a compressor), engine throttle position, AIS throttle position, VVT, EGR valve position, etc.

At 304, the method may include determining whether a torque request or a commanded engine torque is greater than a torque threshold. For example, the threshold may be a nominal road load (e.g., 5 Bar). The torque request may be representative of a transient condition in which the engine torque quickly changes. If the torque request is greater than the threshold, then the method 300 moves to 306. Otherwise, the method 300 returns to other operations.

At 306, the method 300 may include determining whether a desired MAP is greater than a TIP. The desired manifold absolute pressure may correspond to the commanded engine torque. If the desired MAP is greater than the TIP, then a torque shortfall may be identified. If the desired MAP is greater than the TIP, then the method 300 moves to 308. Otherwise, the method 300 returns to other operations.

At 308, the method 300 may include determining whether a pressure drop or a differential pressure across the AIS throttle is greater than a pressure threshold. In one example, the pressure threshold may be substantially zero. The pressure threshold may indicate that the AIS throttle is at least partially closed, and may be a potential contributor to the torque shortfall. As cold end exhaust pressure increases with higher mass flows, the delta pressure across the partially closed AIS throttle may be redundant and may be reduced without losing EGR control. If the pressure drop across the AIS throttle is greater than the pressure threshold, then the method 300 moves to 310. Otherwise, the method 300 moves to 312.

At 310, the method 300 may include opening the AIS throttle. In one example, the AIS throttle is fully opened to make the pressure drop across the AIS throttle substantially zero. By opening the AIS throttle, the TIP may be increased to provide additional air flow to compensate for the torque shortfall.

At 312, the method 300 may include determining whether EGR flow or a desired EGR is greater than an EGR threshold. In one example, the EGR threshold may be substantially zero. If the EGR flow is greater than the threshold, then the method 300 moves to 314. Otherwise, the method 300 moves to 316.

At 314, the method 300 may include reducing EGR flow. In one example, EGR flow may be reduced by closing the EGR valve 142 shown in FIG. 1. In one example, the EGR valve may be fully closed to prevent the flow of EGR into the intake passage. By closing the EGR valve, air charge dilution may be reduced and thus a MAP required to achieve desired airflow may also be reduced. By reducing the desired MAP the TIP may be able to achieve the desired MAP to provide an appropriate engine torque response.

At 316, the method 300 may include determining whether a volumetric efficiency is less than an efficiency threshold. In one example, the efficiency threshold may be an optimal volumetric efficiency for the given operating conditions. If the volumetric efficiency is less than the efficiency threshold, the method 300 moves to 318. Otherwise, the method 300 moves to 320.

At 318, the method 300 may include adjusting VVT to decrease internal EGR trapping in the cylinders. In one example, VVT may be adjusted by reducing exhaust valve closing time and/or advancing intake valve opening timing. For example, the VVT may be adjusted by cam actuation systems 51 and 53 shown in FIG. 1. By decreasing the internal EGR trapping in the cylinders an air flow/power ratio may be increased at a reduced desired MAP. The power increase may compensate for the torque shortfall to provide an appropriate torque response.

At 320, the method 300 may include determining whether the torque request is met. In other words, the method may include determining whether the transient condition switches to a steady state condition. In one example, the determination may be made by checking whether boost pressure increases to provide the appropriate TIP to meet the desired MAP. If the torque request is met, then the method 300 moves to 322. Otherwise, the method 300 returns to 308 to continue with transient actions to provide an appropriate torque response.

At 322, the method 300 may include adjusting actuators back to steady state settings because the transient torque request has been met. In one example, the AIS throttle may be at least partially closed (e.g., the AIS throttle opening may be reduced), the EGR valve may be at least partially opened (e.g., the EGR valve opening may be increased), and the VVT may be adjusted to increase internal EGR trapping in the cylinders (e.g., OVC time may be increased and/or IVC may be retarded). By returning the actuators back to steady state setting after the transient torque request has been met, a possibility of overshooting the torque request by a substantial amount may be reduced.

The above described method may be performed to provide an appropriate torque response in a timely manner while minimizing impact to fuel economy. In particular, when a relatively small increase in torque is needed to compensate for the torque shortfall, the delta pressure across the AIS throttle can be eliminated.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. A method for an engine, comprising:
during a transient condition, when a desired inlet manifold pressure is greater than a throttle inlet pressure of a first throttle, if a pressure drop across a second throttle that is positioned upstream from the first throttle in an intake passage is greater than a pressure threshold, opening the second throttle to increase the throttle inlet pressure of the first throttle.

2. The method of claim 1, further comprising:
during the transient condition, when the desired inlet manifold pressure is greater than the throttle inlet pressure, if a volumetric efficiency is less than a threshold, adjusting a variable valve timing system to decrease an internal EGR trapping in cylinders of the engine.

3. The method of claim 1, further comprising:
during the transient condition, when the desired inlet manifold pressure is greater than the throttle inlet pressure, if a LP-EGR flow delivered to the intake passage from a LP-EGR system is greater than an EGR threshold, reducing the LP-EGR flow.

4. The method of claim 3, wherein the EGR threshold is zero.

5. The method of claim 3, wherein reducing the LP-EGR flow includes closing an EGR valve in the LP-EGR system.

6. The method of claim 1, further comprising:
when the transient condition switches to a steady state condition, at least partially closing the second throttle.

7. The method of claim 1, wherein the pressure threshold is zero.

8. The method of claim 1, wherein the transient condition includes a commanded engine torque being greater than a torque threshold.

9. An engine system comprising:
a compression device including a compressor positioned in an intake passage;
a first throttle positioned downstream of the compressor in the intake passage;
a second throttle positioned upstream of the compressor in the intake passage; and
a controller comprising a processor and computer-readable storage holding instructions executable by the processor to:
during a transient condition, when a desired inlet manifold pressure is greater than a throttle inlet pressure of the first throttle, if a pressure drop across the second throttle is greater than a pressure threshold, open the second throttle to increase the first throttle inlet pressure.

10. The engine system of claim 9, further comprising:
a variable valve timing system; and
wherein the computer-readable storage further holds instructions executable by the processor to:
during the transient condition, when the desired inlet manifold pressure is greater than the throttle inlet pressure, if a volumetric efficiency is less than a threshold, adjust the variable valve timing system to decrease an internal EGR trapping in cylinders of the engine.

11. The engine system of claim 9, further comprising:
a LP-EGR system to deliver LP-EGR from an exhaust passage to the intake passage upstream of the compressor; and
wherein the computer-readable storage further holds instructions executable by the processor to:
during the transient condition, when the desired inlet manifold pressure is greater than the throttle inlet pressure, if a LP-EGR flow delivered to the intake passage from the LP-EGR system is greater than an EGR threshold, reduce the LP-EGR flow.

12. The engine system of claim 11, wherein the EGR threshold is zero.

13. The engine system of claim 11, further comprising:
an EGR valve positioned in the LP-EGR system to control the LP-EGR flow; and
wherein the EGR valve is closed to reduce the LP-EGR flow.

14. The engine system of claim 9, wherein the computer-readable storage further holds instructions executable by the processor to:
when the transient condition switches to a steady state condition, at least partially close the second throttle.

15. The engine system of claim 9, wherein the pressure threshold is zero.

16. The engine system of claim 9, wherein the transient condition includes a commanded engine torque being greater than a torque threshold.

17. A method comprising:
during a transient condition, when a desired inlet manifold pressure is greater than a throttle inlet pressure of a first throttle,
if a pressure drop across a second throttle that is positioned upstream from the first throttle in an intake passage is greater than a pressure threshold, opening the second throttle to increase the first throttle inlet pressure;
if a volumetric efficiency is less than a threshold, adjusting a variable valve timing system to decrease an internal EGR trapping in cylinders of the engine; and
if a LP-EGR flow delivered to the intake passage from a LP-EGR system is greater than an EGR threshold, reducing the LP-EGR flow.

18. The method of claim 17, further comprising:
when the transient condition switches to a steady state condition,
at least partially closing the second throttle;
adjusting the variable valve timing system to decrease internal EGR trapping in the cylinders of the engine; and
decreasing the LP-EGR flow.

19. The method of claim 17, wherein the pressure threshold is zero and the EGR threshold is zero.

20. The method of claim 17, wherein the transient condition includes a commanded engine torque being greater than a torque threshold.

* * * * *